Figure 4:
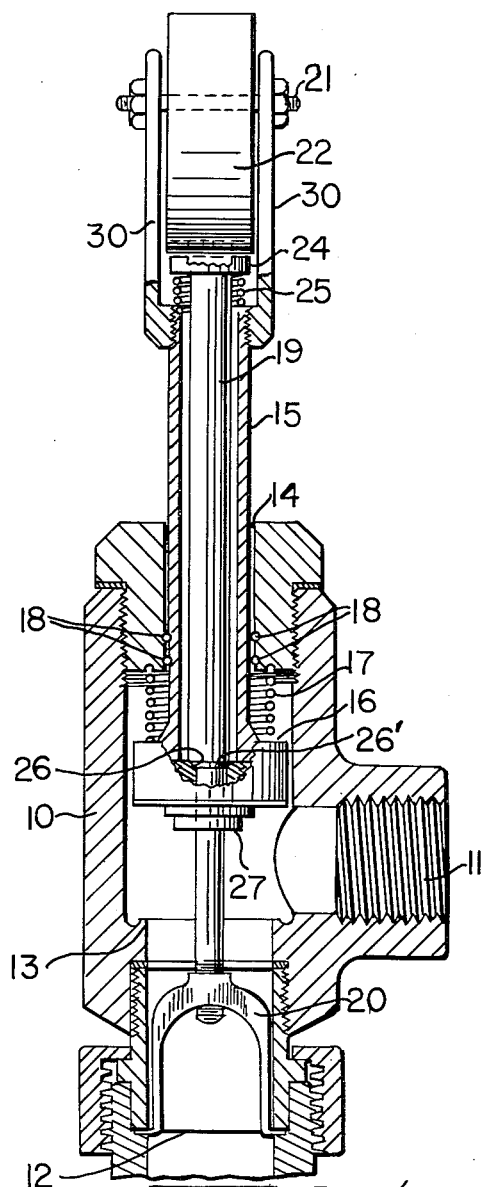

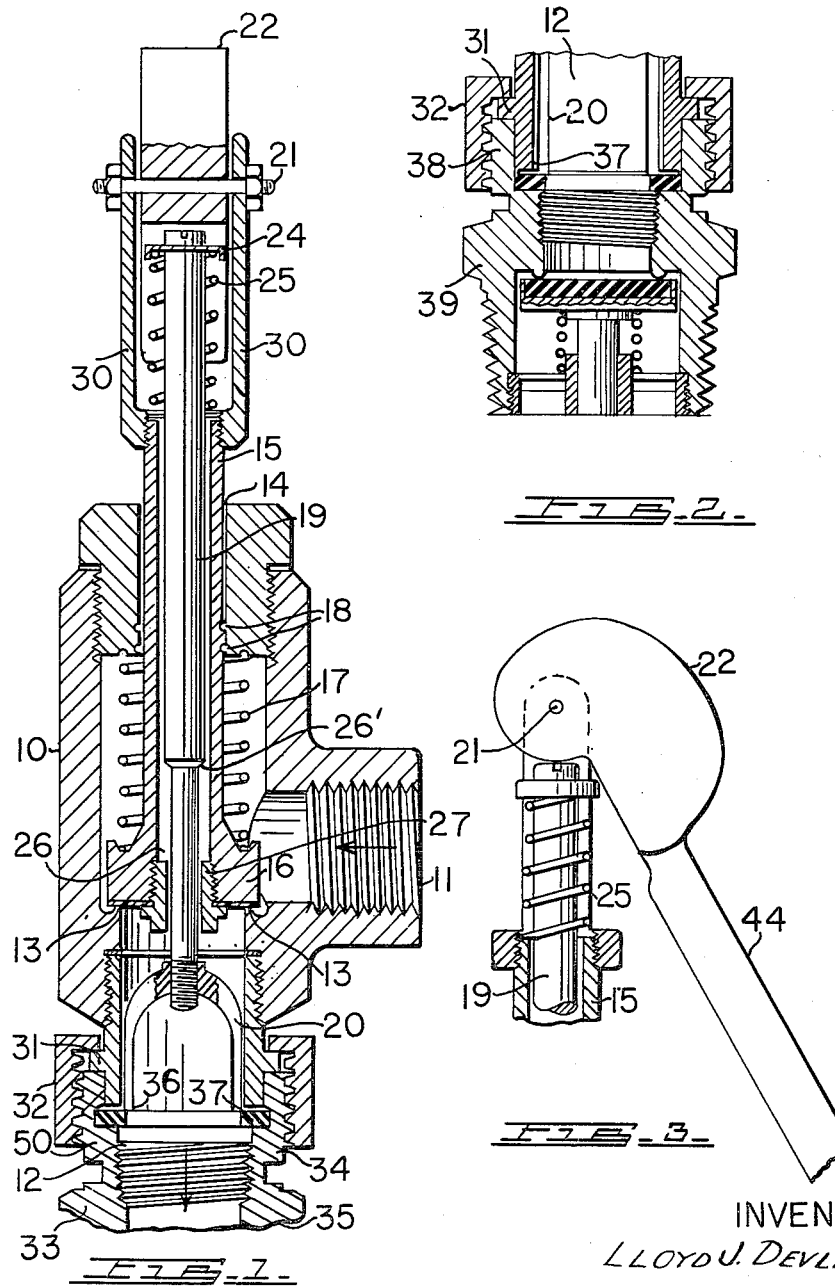

April 18, 1961

L. J. DEVLIN 2,980,387

SAFETY VALVE

Filed Dec. 16, 1958

3 Sheets-Sheet 2

INVENTOR.
LLOYD J. DEVLIN
BY Smart & Biggar
ATTORNEYS.

April 18, 1961 L. J. DEVLIN 2,980,387
SAFETY VALVE
Filed Dec. 16, 1958 3 Sheets-Sheet 3
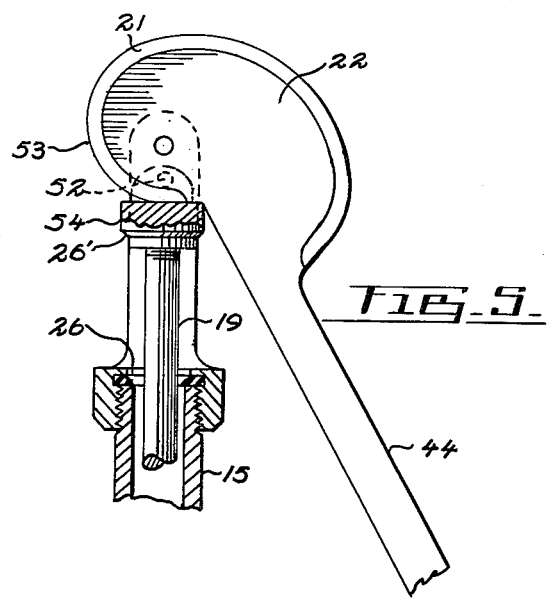
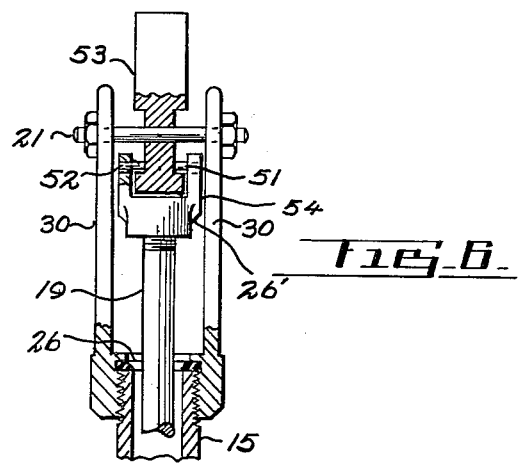
INVENTOR
LLOYD J. DEVLIN
BY- Smart & Biggar
ATTORNEYS

United States Patent Office 2,980,387
Patented Apr. 18, 1961

2,980,387

SAFETY VALVE

Lloyd J. Devlin, P.O. Box 9, Newton, British Columbia, Canada

Filed Dec. 16, 1958, Ser. No. 780,839

7 Claims. (Cl. 251—149)

The present invention relates to a valve which may be used to control the flow of high pressure fluids and is useful in transferring under pressure gases such as propane, butane or anhydrous ammonia from one storage tank to another.

This application is a continuation-in-part of my earlier United States patent application Serial No. 741,837, filed June 13, 1958, now abandoned.

It is generally accepted practice to store gases such as propane, butane or anhydrous ammonia in liquid form at high pressures, often as high as 250 pounds per square inch. Several advantages are obtained from storage at high pressures; the size of storage tanks is materially reduced, the gases can be transferred more quickly from one storage tank to another using liquid pumps and a larger quantity of gas can be stored in a given size of tank. A consequence of storing these gases at high pressure is that extreme care is required in their handling, for example, if a valve which controls the gases is accidentally opened to the atmosphere, and by some means ignited, an explosion may result.

The danger of explosion is particularly serious in the transfer of high pressure gases from main storage tanks to consumer's receptacles. If a consumer's receptacle or "bottle" is refilled from a tank truck, a hose is run from the tank truck to the receptacle and connected thereto. Normally, the end of the hose is provided with a valve for connection to the receptacle to control the flow of gas. If the valve is opened, accidentally or otherwise, when not connected to the receptacle, an explosion may be caused by ignition of the escaped gas.

The present inventor has discovered how to avoid this danger of explosion by providing means which makes the operation of the valve dependent on there being a proper connection between the outlet of the valve and the receptacle. According to the invention, a valve opening mechanism is provided of which the operation depends on the restraint of a part of the mechanism by the connection to the receptacle. This part is adapted to become restrained automatically by the actual connection between the outlet of the valve and the receptacle.

A valve according to the present invention comprises a body having an inlet opening, and an outlet opening, interconnected by a passageway. A valve seat is positioned in the passageway substantially in axial alignment with the outlet opening, and coupling means are provided for connecting the outlet opening to the receptacle. The valve includes a tubular valve stem having a head adapted to fit against the valve seat to close the passageway and having an opening coaxial with the tubular valve stem. A push rod passes through the tubular valve stem and the coaxial opening in the head and means are provided for forming a seal between the push rod and the valve stem. The valve stem passes through a sliding seal in an opening in the body opposite the outlet opening. The valve includes means operable to produce axial relative motion between the valve stem and the push rod. An anchor is maintained in the passageway between the outlet opening and the valve seat by the coupling means. This anchor is fixed to the push rod thereby anchoring the push rod with relation to the body when the outlet opening is connected to the receptacle by the coupling means. Spring means are provided to urge the head against the seat.

According to an embodiment of the invention, additional spring means may be provided to urge the anchor towards the valve seat. In another embodiment this additional spring means is omitted and a connection is provided between the push rod and the means operable to produce axial relative motion between the valve stem and the push rod.

In accordance with the invention the seal between the push rod and the head may be formed only when the valve is in the open position.

A valve constructed in accordance with the present invention may be used for safely transferring such volatile and potentially dangerous fluids as propane, butane or anhydrous ammonia from a main reservoir to a receptacle. The probability of an explosion is greatly reduced when this valve is used because the gas cannot be released from the main reservoir unless the valve is coupled to the receptacle. Prior to the engagement of the coupling means to the receptacle, the anchor is free to move out of the outlet opening if the push rod is moved relative to the valve stem so that the head of the valve cannot be lifted from its seat and the valve cannot be opened. If the outlet opening is secured to the receptacle by the coupling means then the push rod is held immobile and relative motion between the push rod and the valve stem can occur to open the valve and permit the flow of the fluid. In use, the valve according to the present invention has its inlet connection attached to the outlet conduit of the main reservoir and the outlet of the valve may be connected in turn to each of the receptacles to be filled.

According to a feature of the invention the means to produce axial relative motion between the push rod and the valve stem may be connected to the valve stem to make the closure of the valve, when connected to a receptacle, dependent solely on operation of the means for producing axial relative motion between the push rod and the valve stem.

If a valve is to be used to control the flow of fluids such as liquid propane, then it is important to provide means for relieving the pressure between the outlet of the valve and the inlet of the receptacle to prevent the operator of the valve from accidentally freezing his hands. The present invention provides means to relieve this pressure and thereby prevent accidental injury to the operator of the valve.

The invention will be described in more detail with reference to the attached drawings in which:

Figure 1 is a vertical cross-section of a valve according to the present invention, in closed position and connected to a consumer's receptacle which is to be filled, Figure 2 is a fragmentary vertical cross-section showing the outlet of the valve illustrated in Figure 1 connected to the inlet valve of a tank, Figure 3 is a side elevation of the operating mechanism of the valve illustrated in Figure 1, Figure 4 is a vertical section of the valve shown in Figure 1 in the open position, Figure 5 is a side elevation of an alternative valve operating mechanism according to the invention, and Figure 6 is a front elevation of the valve operating mechanism shown in Figure 5.

The valve shown in Figures 1 and 4 comprises a hollow valve body 10 in which an inlet opening 11 and outlet opening 12 have been formed. A seat 13 which is situated in axial alignment with, and immediately above, the outlet opening 12 is formed in the body 10 of the valve.

A further opening 14 is provided opposite the outlet opening 12 and is formed to accommodate the hollow stem 15 of the valve. The hollow stem 15 has formed on one end, a head 16 which in Figure 1 bears against the seat 13. In Figure 1, the head 16 is urged against the seat 13 by means of the spring 17 situated between the back of the head 16 and the body 10, surrounding the stem 15. The head 16 is also urged against the seat 13 by the pressure on the inlet side of the head. Sliding seals 18 are provided on the stem 15 to seal the joint between the stem 15 and the opening 14. A head fitting 27 having a conical seat 26 is fitted to head 16.

A push rod 19 is slidably fitted through the centre of the stem 15 and head fitting 27. The lower end of the push-rod 19 is threaded into a spider 20 which is inserted in the outlet opening 12. The push-rod 19 has a conical shoulder 26' adapted to bear against the conical seat 26 when the valve is opened (Figure 4). An operating handle 44 is fastened to a cam 22 as shown in Figure 3. The cam 22 is mounted on the pin 21 which is fastened through a hole formed through a pair of mounting brackets 30. The mounting brackets 30 are fastened to the upper end of the valve stem 15 by means of a threaded connection. A collar 24 is fitted to the upper end of the push-rod 19 in order to maintain helical spring 25 in compression between the collar 24 and the upper end of stem 15.

In Figure 1, the outlet 12 is provided with an annular projection 31 against which a threaded collar 32 bears. The collar 32 is adapted to engage with the threaded neck 33 of a container 35. The neck 33 has a flange 34 which urges the base 36 of the spider 20 against the rim 37 of the outlet opening 12 when the collar 32 is tightened on the neck 33. A gasket 50 is, as usual, provided to seal the joint.

In Figure 2 the collar 32 engages with the threaded end 38 of an inlet valve 39 of a type commonly used on propane bulk tanks. The valve 39 is connected to a filter fitting on a standard propane tank in the usual manner.

In operation, the inlet connection 11 of the valve is fastened directly to a hose or conduit from a storage tank or tank truck containing the fluid to be transferred and the outlet 12 of the valve is fastened in turn to the various receptacles to be filled. In the closed position (Figure 1) the shoulder 26' on the push-rod 19 is held away from the conical seat 26 in the heat fitting 27 and the outlet opening 12 is connected to atmospheric pressure by the passageway formed along the sides of the push rod 19.

If the outlet 12 is coupled to the receptacle and the valve operating mechanism is actuated then the eccentric 22 will bear against the push-rod 19 which will push against the spider 20. The spider 20 however will be held against the flanges 34 of the container and hence against the rim 37 of the outlet opening 12 by means of the collar 32 engaged with the neck 33. The push-rod 19 will then be held fast. The action of the eccentric 22 will then be to lift the valve stem 15 and the valve head 16 from the seat 13 thereby opening the valve. In the fully open condition the shoulder 26' will bear against the conical seat 26 and close the passageway to the atmosphere formed along the sides of the push rod 19. A sealed connection is thereby formed between the inlet 11 and the outlet 12 permitting the passage of the fluid to be controlled through the valve. The springs 17 and 25 will oppose the motion of the valve head 16 relative to the valve body 10 and the valve stem 15 relative to the push rod 19 respectively, and once the valve actuating mechanism is moved toward the closed position these springs will aid in closing the valve.

If the valve operating mechanism is accidentally actuated before the outlet of the valve is fastened to a receptacle, the push rod 19 will push the spider 20 out of the outlet opening 12 so that no operating force is applied to the valve stem 15 and therefore the head 16 will remain seated against the seat 13 preventing escape of the fluid.

When the receptacle 35 has been filled with fluid and the valve is closed, the shoulder 25 is lifted from the conical seat 26 and the space between the valve seat 13 and the inlet 33 of the receptacle 35 will be connected to the atmosphere by the passageway formed along the sides of push rod 19 and the pressure contained between these two points will be bled off automatically. The valve may then be removed from the container without danger of accident. If the pressure between the outlet of the valve and the inlet of the receptacle was not dissipated, and a fluid such as liquid propane was being handled, then the operator of the valve might freeze his hands in removing the valve from the container. In this connection it should be noted that the vaporization temperature of liquid propane is −44° F. at atmospheric pressure.

If the valve according to the present invention is to be used in a situation where it is undesirable to relieve the pressure at the outlet of the valve after closing the valve, then the seat 26 may be replaced by a sliding seal between the push rod and the head of the valve.

Figures 5 and 6 show an alternative construction of the valve opening mechanism. The eccentric 22 is provided with a flange 53 which passes beneath pins 51 and 52 in a fitting 54. The push rod 19 is thereby constrained to follow the motion of the flange 53 on either opening or closing of the valve. Once again the mounting brackets 30 are fastened to the upper end of the valve stem 15 by a threaded connection and a pin 21 fastened through the mounting brackets 30 and acts as a pivot for eccentric 22. A handle 44 is provided for pivoting the eccentric 22 about pin 21. The conical seat 26 is now located at the upper end of valve stem 15 and conical shoulder 26' is fitted to the enlarged end 54 of the push rod 19.

The flange 53 being held between pins 51 and 52 provides a positive mechanical connection which permits the valve to be locked in either open or closed position or any intermediate position by suitable means (not shown) fastened to handle 44. The previously provided head fitting 27 which is threaded into the head 16 is now incorporated in the upper end of valve stem 15. The pressure accumulated between the head 16 of the valve and the outlet opening 12 is led off as before when the conical shoulder 26' is lifted from the conical seat 26.

What I claim as my invention is:

1. A valve for controlling the flow of a fluid to a receptacle, said valve comprising a body having an inlet opening and an outlet opening interconnected by a passageway; a valve seat in said passageway substantially in axial alignment with the outlet opening; coupling means adapted to connect the outlet opening to the receptacle; a tubular valve stem having a head, said head having an opening coaxial with said tubular valve stem and being adapted to fit against said valve seat to close said passageway; a push rod adapted to pass through the tubular valve stem and the coaxial opening in said head, means for forming a seal between said push rod and said valve stem; an opening in said body positioned opposite said outlet opening, said valve stem passing through the opening positioned opposite said outlet opening, means forming a sliding seal between said valve stem and said opening opposite said outlet opening, means operable to produce axial relative motion between said valve stem and said push rod; an anchor adapted to be maintained in said passageway between the outlet opening and the valve seat by said coupling means, said anchor being fixed to said push rod thereby anchoring said push rod with relation to said body when said outlet opening is connected to the receptacle by said coupling means, and spring means urging said head against said seat.

2. A valve according to claim 1 wherein the means for forming a seal between the push rod and the valve stem comprises a frusto-conical shoulder on the push rod and a cooperating conical seat in the coaxial opening in the head whereby a seal is formed when the head is raised from the valve seat.

3. A valve according to claim 1 wherein the means operable to produce axial relative motion between the valve stem and the push rod comprises a circular cam having an eccentric axis of rotation fixed relative to said valve stem, said cam being adapted to bear against said push rod, so that eccentric motion of said cam moves said push rod relative to said valve stem, and means for rotating said cam.

4. A valve for controlling the flow of fluid to a receptacle, said valve comprising a body having an inlet opening and an outlet opening interconnected by a passageway, a valve seat in said passageway substantially in axial alignment with the outlet opening; coupling means adapted to connect the outlet opening to the receptacle; a tubular valve stem having a head, said head having an opening coaxial with said tubular valve stem and being adapted to fit against said valve seat to close said passageway; a push rod adapted to pass through the tubular valve stem and the coaxial opening in said head, means for forming a seal between said push rod and said valve stem; an opening in said body positioned opposite said outlet opening, said valve stem passing through the opening positioned opposite said outlet opening, means forming a sliding seal between said valve stem and said opening opposite said outlet opening, means operable to produce axial relative motion between said valve stem and said push rod; an anchor adapted to be maintained in said passageway between the outlet opening and the valve seat by said coupling means, said anchor being fixed to said push rod thereby anchoring said push rod with relation to said body when said outlet is connected to the receptacle by said coupling means, first spring means urging said head against said seat, and second spring means urging said anchor towards the valve seat.

5. A valve according to claim 4 wherein the means for forming a seal between the push rod and the valve stem comprises a frusto-conical shoulder on the push rod and a cooperating conical seat in the coaxial opening in the head whereby a seal is formed when the head is raised from the valve seat.

6. A valve according to claim 4 wherein the means operable to produce axial relative motion between the valve stem and the push rod comprises a circular cam having an eccentric axis of rotation fixed relative to said valve stem, said cam being adapted to bear against said push rod, so that eccentric motion of said cam moves said push rod in opposition to the second spring means, and means for rotating said cam.

7. A valve according to claim 1 wherein said means operable to produce axial relative motion between said valve stem and said push rod comprises a circular cam having an eccentric axis of rotation fixed relative to said stem and provided with a flange adapted to engage the upper end of the push rod so that eccentric motion of said cam moves said push rod relative to said valve stem.

References Cited in the file of this patent

UNITED STATES PATENTS

| | | |
|---|---|---|
| 474,342 | Mesick | May 3, 1892 |
| 1,330,798 | Giles | Feb. 17, 1920 |
| 1,454,367 | Yardley | May 8, 1923 |
| 2,543,589 | Newcomb | Feb. 27, 1951 |
| 2,679,407 | Badger | May 25, 1954 |